United States Patent Office 3,555,088
Patented Jan. 12, 1971

3,555,088
PLICATYL HYDRAZIDE
John Howard, Vancouver, British Columbia, and Terence D. McIntosh, North Vancouver, British Columbia, Canada, assignors to ITT Rayonier Incorporated, New York, N.Y., a corporation of Delaware
No Drawing. Filed Mar. 13, 1968, Ser. No. 712,580
Int. Cl. C07c 103/19
U.S. Cl. 260—559        1 Claim

ABSTRACT OF THE DISCLOSURE

A new composition of matter comprising plicatyl hydrazide, and the use of this compound as an antioxidant for fats and oils, is disclosed.

BACKGROUND OF THE INVENTION

Plicatic acid has the following structure as shown by its chemical degradation products and X-ray crystallography in investigations by Gardner, Barton and MacLean, Can. J. Chem. 37, 1703–9 (1959); Gardner, MacDonald and MacLean, Can. J. Chem. 38, 2387–94 (1960) and Gardner, Swan, Sutherland and MacLean, Can. J. Chem. 44. 52–8 (1966).

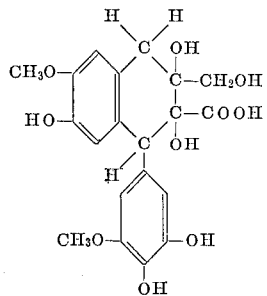

A process for the separation and recovery of plicatic acid from the aqueous extract of western red cedar is described in U.S. patent application Ser. No. 386,429, by D. W. Langille and Kenneth R. Gray, filed July 30, 1964, now abandoned, and a process for preparing pure crystalline plicatic acid tetrahydrate is described in our copending U.S. patent application Ser. No. 687,092, filed Dec. 1, 1967.

Plicatic acid is known to be a safe and effective antioxidant for edible fats and oils. Moreover, the availability of very pure crystalline plicatic acid tetrahydrate has made possible the preparation of other pure derivatives of plicatic acid of interest to manufacturers of pharmaceuticals, food antioxidants, and similar products where maximum purity, stability and reproducibiilty are of importance.

SUMMARY OF THE INVENTION

In the course of an intensive investigation of the derivatives of plicatic acid we have discovered and developed several procedures for preparing, isolating and recovering chemically pure plicatyl hydrazide in both its crystalline trihydrate and anhydrous forms. We have determined the essential chemical and physical characteristics of this new composition of matter, and have established that it has the empirical formula $C_{20}H_{24}O_9N_2$ and the structural formula:

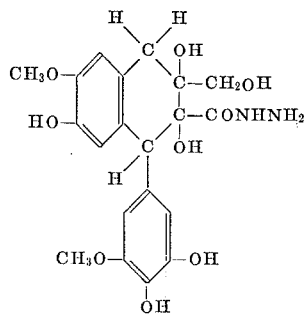

Moreover, extensive tests have shown that the plicatyl hydrazide of our invention is nontoxic and that it is an effective antioxidant for edible fats and oils.

DETAILED DESCRIPTION

The crystalline plicatyl hydrazide trihydrate and anhydrous plicatyl hydrazide of our invention are prepared and recovered from methyl or ethyl plicatate and from plicatin (the lactone derivative of plicatic acid) by the following alternative procedures.

In one procedure a suspension of crystalline methyl or ethyl plicatate in methanol or water is reacted with an excess of hydrazine until the ester is dissolved and the hydrazide is formed. Excess alcohol and hydrazine are then removed, e.g., by vacuum distillation, and a solution of the residue in water is cooled. The solution is seeded (or the plicatyl hydrazide trihydrate will sometimes autogeneously crystallize out) and the crystals separated, washed and recovered. The anhydrous plicatyl hydrazide can be prepared by vacuum drying of the trihydrate.

In the second procedure, plicatin (plicatic acid lactone) is converted to plicatyl hydrazide trihydrate by dissolving the plicatin in methanol and then adding it to a solution of hydrazine hydrate in methanol at ambient temperature. Following completion of the reaction, the methanol is removed under vacuum and the residue taken up in water. Plicatyl hydrazide trihydrate then crystallizes out in good yield and can be isolated as above.

As will subsequently appear, the plicatyl hydrazide of our invention is an effective antioxidant for oils and fats. It has metal complexing ability, it is nontoxic and preliminary tests have indicated that it has anti-cancer properties.

Plicatyl hydrazide may be prepared from plicatin, a known compound, or from methyl or ethyl plicatates which are themselves new compositions of matter. The following two examples describe the preparation of methyl plicatate and ethyl plicatate, respectively, from plicatic acid.

EXAMPLE I

Crystalline plicatic acid tetrahydrate (4.94 g., 10 mm) was dissolved in 25 ml. of methanol containing 2.0 ml. of concentrated sulfuric acid. The mixture was then seeded and set aside at room temperature in a stoppered flask for four days. During this time the white crystals which had deposited were removed by filtration, washed free of sulfuric acid, dried under high vacuum at 100° C. and found to weigh 3.7 g. (85% yield). The melting point was 227–30° with some decomposition (Leitz hot stage apparatus).

*Analysis.*—Cal'd for methyl plicatate, $C_2(H_{24}O_{10})$ (percent): C, 57.79; H, 5.54; $OCH_3$, 21.3. Found (percent): C, 57.58; H, 5.54; $OCH_3$ 21.0.

The infra red spectrum in mineral oil showed a characteristic ester band at 1735 cm.$^{-1}$. The ester was optically active, $[\alpha]_D^{27°}+67.6°$ (C., 5 DMF).

EXAMPLE II

Crystalline plicatic acid tetrahydrate (4.94 g., 10mM.) was dissolved in 25 ml. of denatured ethanol (Fisher Scientific Company) containing 2 ml. of concentrated sulfuric acid. The solution was allowed to stand at room temperature in a stoppered flask for one month after which the white crystalline product was removed by filtration washed using alcohol and dried at 100° C. under high vacuum. The yield was 3.32 g. or 76%. Melting point 214–16° with some decomposition.

*Analysis.*—Cal'd for ethyl plicatate, $C_{22}H_{26}O_{10}$ (percent): C, 58.66; H, 8.52. Found (percent): 58.75; H, 5.83.

The compound was optically active, $[\alpha]_D^{27}+77.2°$ (C., 5 DMF) and the infra red spectrum in mineral oil showed a characteristic ester band at 1735 cm.$^{-1}$.

The following examples are illustrative, but not limitative, of the procedures by which the plicatyl hydrazide of our invention is produced.

EXAMPLE III

Seventy-five grams (75 g.) of crystalline methyl plicatate (172 mM.) was suspended in 345 ml. of methanol and 34.5 g. of hydrazine hydrate (690 mM.). The mixture was then refluxed for a period of 80 min. during which time the ester completely dissolved. The methanol and most of the hydrazine were then removed under vacuum and the syrupy residue dissolved in 475 ml. of hot water, a small amount of insoluble material being removed from the hot solution by filtration. Upon cooling in the refrigerator, white crystals deposited to give a semi-solid mass of product overnight. Vacuum filtration and washing of the crystals using two 40 ml. portions of ice-cold water followed by air-drying at room temperature yielded 68.3 g. of colorless plicatyl hydrazide trihydrate melting point 176° C. (with loss of water and some decomposition).

This material contained 10.74% water by Karl Fischer analysis which remained constant over an extended period of air drying, (theory for plicatyl hydrazide trihydrate is 11.0% water). Drying under high vacuum at room temperature or more quickly at 100° C. resulted in the total loss of hydrated water. A sample which had been recrystallized two more times from 5 parts of hot water and thoroughly dried under vacuum at 100° C. was found to melt with some decomposition at 185–6° C. and contained 55.0% carbon, 5.67% hydrogen and 6.70% nitrogen. Theory for anhydrous plicatyl hydrazide $C_{20}H_{24}O_9N_2$ is: 55.04% carbon, 5.54% hydrogen and 6.42% nitrogen. The anhydrous compound was dextrorotary in dimethyl formamide, $[\alpha]_D^{27°}=+21.4°$ (C., 5 DMF). In ethanol the trihydrate was found to be laevorotary $$[\alpha]_D^{27°}=-55.0°$$

(C., 5 $C_2H_5OH$). The compound was found to be homogeneous on a thin layer chromatograph having an RF value of 0.52 on silica gel using butanol:acetic acid:water, 14:2:5 parts by volume as solvent and iodine vapor as developing reagent.

EXAMPLE IV

In a similar manner to Example III above, 2.25 g. of crystalline ethyl plicatate (5 mM.) was refluxed in a mixture of 10 ml. of methanol and 1 g. of hydrazine (20 mM.). After 5 min. all the ester had dissolved and the solvents removed under vacuum. The residual syrup was dissolved in 7 ml. of hot water and a small amount of insoluble starting ester removed by filtration. On cooling 1.4 g. of colorless crystalline plicatyl hydrazide trihydrate identical to material in Example III was obtained.

EXAMPLE V

Eight and seventy-two hundreths grams (8.72 g.) of crystalline methyl plicatate (20 mM.) was refluxed in a mixture of 45 ml. of water and 1.2 g. of hydrazine hydrate (24 mM.). Within 15 min. all the ester had dissolved and after one hour the mixture was cooled in the refrigerator and seeded. 6.8 g. of white crystalline plicatyl hydrazide trihydrate was obtained after vacuum filtration, washing with ice cold water and air drying overnight.

EXAMPLE VI

One gram of plicatic acid lactone (plicatin, 2.5 mM.) dissolved in 10 ml. of methanol was added drop by drop over a 5 min. period to a solution of 1 g. of hydrazine hydrate (20 mM.) in 10 ml. of methanol. Thin layer chromatography indicated complete conversion of the plicatin to plicatyl hydrazide within one hour at room temperature. The methanol solvent was removed under vacuum and the residue crystallized from 5 ml. of hot water to give 0.9 g. of colorless crystalline plicatyl hydrazide trihydrate whose physical properties were identical to those quoted in Example III above.

EXAMPLE VII

Picatyl hydrazide was tested as an antioxidant in edible fats and oils using the method of the American Oil Chemists Society (A. O. M. active oxygen method) and the Schall method. Lard and safflower oil were obtained free of antioxidants and checked for peroxide to ascertain that they were fresh. Plicatyl hydrazide was added at a concentration of 0.01% by first dissolving it in ethanol and adding the solution to the fat and to the oil, followed by heating on a boiling water bath for 5 minutes.

In the A. O. M. test, 20 ml. samples of the fat and oil containing plicatyl hydrazide, and untreated samples to serve as controls, were placed in test tubes. The tubes were placed in an oil bath controlled at 97.8° C. and a capillary tube was immersed in each sample and connected to an apparatus which delivered air at a rate of 2.33 ml. per second. At intervals, samples were removed and peroxide determinations were made by iodometric titration. The A. O. M. Stability Value is defined as the number of hours required to reach a peroxide test value of 100 milliequivalents per 1000 g. of oil.

In the Schall test, 50 g. samples prepared as described above were placed in 150 ml. beakers and then placed in a forced air oven at 60° C. Peroxide determinations were made at intervals and comparisons were made of the time required to reach 100 milliequivalents per 1000 g. of oil.

The results of these tests are reported in the following tables.

TABLE 1A

|  | A.O.M., hours | Schall, hours |
|---|---|---|
| Lard with plicatyl hydrazide | 18.2 | 475 |
| Lard alone | 9.2 | 196 |

TABLE 1B

|  | A.O.M., hours | Schall, hours |
|---|---|---|
| Safflower oil with plicatyl hydrazide | 7.7 | 436 |
| Safflower oil alone | 6.0 | 317 |

We claim:
1. A new composition of matter comprising plicatyl hydrazide having the structural formula
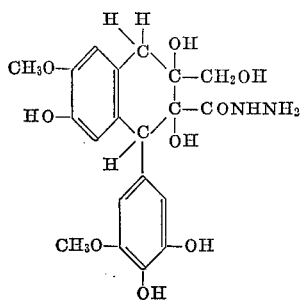
References Cited
UNITED STATES PATENTS
3,466,327    1969    Tschesche et al. ____ 260—559
HENRY R. JILES, Primary Examiner
H. I. MOATZ, Assistant Examiner
U.S. Cl. X.R.
252—403